United States Patent Office 3,291,684
Patented Dec. 13, 1966

3,291,684
CONTROL OF BACTERIA AND FUNGI WITH AMINE CYANOFERRATES
Glentworth Lamb, Trenton, N.J., assignor to American Cyanamid Company, Stamford, Conn., a corporation of Maine
No Drawing. Filed Nov. 30, 1965, Ser. No. 510,700
10 Claims. (Cl. 167—22)

The present invention relates to a method of controlling pathogenic organisms responsible for disease and degradation of organic materials. More particularly, the invention relates to a method for protecting organic materials including agricultural crops, both harvested and growing, from attack by bacteria and fungi by applying thereto or in the locus of the materials or crops to be protected an effective but toxic amount of an amine cyanoferrate of the formula:

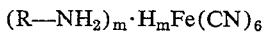
or

wherein R is an alkyl substituent containing from 6 to 18 carbon atoms; R' represents an alkyl substituent containing from 4 to 14 carbon atoms, or an alkoxyalkyl or alkoxyalkoxyalkyl substituent containing from 6 to 16 carbon atoms; X is either oxygen or sulfur; R'' is an alkylene bridge containing from 2 to 4 carbon atoms; and $m$ represents the integer 3 or 4.

Alkylamines and salts thereof are well known. However, such compounds have not been wholly satisfactory for effectively treating, for instance, agricultural crops. This is because those compounds which have been available heretofore have either been ineffectual in controlling bacteria and fungi or were found to be far too phytotoxic at effective rates to be useful for foliar application.

Surprisingly, the new class of amine cyanoferrates of the instant invention are markedly effective in the control of bacteria and fungi while being non-phytotoxic at effective rates of application. It is further unexpected to find that the amine cyanoferrates herein possess both bacteriotoxic and fungitoxic activity, since ferro- and ferricyanic acids are devoid of the latter properties.

Among the amine cyanoferrates, alternatively termed "alkylamine ferrocyanides" and "alkylamine ferricyanides," which are contemplated for use in the process of the instant invention are:

Hexylamine ferrocyanide,
Octylamine ferrocyanide,
Decylamine ferrocyanide,
Dodecylamine ferrocyanide,
Tetradecylamine ferrocyanide,
Hexadecylamine ferrocyanide,
Octadecylamine ferrocyanide,
1-methylundecylamine ferrocyanide,
1-methyldodecylamine ferrocyanide,
1-methyltridecylamine ferrocyanide,
2-ethyldecylamine ferrocyanide,
3-butylhexylamine ferrocyanide,
2-propyloctylamine ferrocyanide,
3-methyldecylamine ferrocyanide,
4-butyltetradecylamine ferrocyanide,
3-(octyloxy)propylamine ferrocyanide,
3-(decyloxy)propylamine ferrocyanide,
3-(octylthio)propylamine ferrocyanide,
3-(dodecylthio)propylamine ferrocyanide,
Cocoamine ferrocyanide,
Hexylamine ferricyanide,
Octylamine ferricyanide,
Decylamine ferricyanide,
Dodecylamine ferricyanide,
Tetradecylamine ferricyanide,
Hexadecylamine ferricyanide,
Octadecylamine ferricyanide,
1-methylundecylamine ferricyanide,
1-methyldodecylamine ferricyanide,
1-methyltridecylamine ferricyanide,
2-ethyldecylamine ferricyanide,
3-butylhexylamine ferricyanide,
2-propyloctylamine ferricyanide,
3-methyldecylamine ferricyanide,
4-butyltetradecylamine ferricyanide,
3-(octyloxy)propylamine ferricyanide,
3-(decyloxy)propylamine ferricyanide,
3-(octylthio)propylamine ferricyanide and
3-(dodecylthio)propylamine ferricyanide.

In general, the novel amine cyanoferrate compounds hereinabove named can be readily prepared by reacting (I) an appropriate amine, such as (a) an alkyl amine as for instance, hexylamine, octylamine, dodecylamine or octadecylamine, (b) an alkoxyalkylamine, such as 3-decyloxypropylamine, (c) an alkylthioalkylamine, such as 3-(dodecylthio)propylamine, (d) an alkoxyalkoxyalkoxyalkylamine, such as 3-(ethoxyethoxyethoxy)ethylamine, 3-(ethoxyethoxyethoxy)propylamine and 3 - (methoxypropoxypropoxy)ethylamine or (e) alkoxyalkoxyalkylamine, such as 3-(butoxyethoxy)propylamine with (II) either ferrocyanic acid or ferricyanic acid. In the event ferrocyanic acid is employed, approximately 4 mole proportions of the appropriate amine are reacted with 1 mole proportion of the corresponding acid. If ferricyanic acid is employed, approximately 3 mole proportions of the appropriate amine are reacted with 1 mole proportion of the ferricyanic acid. In one embodiment, the reaction takes place in an alcoholic medium. The latter illustratively includes methanol, ethanol and propanol. Thereafter, the desired product precipitates and is recovered, for instance, by filtration.

In a preferred embodiment, a water soluble amine salt, such as the hydrochloride or acetate salt of the appropriate amine, can alternatively be reacted in an aqueous medium with a water-soluble ferrocyanide or water-soluble ferricyanide, such as, for instance, potassium ferrocyanide, sodium ferricyanide or ammonium ferrocyanide. A further alternative involves the reaction between an appropriate amine per se and an acidfied aqueous solution of an alkali metal salt, such as sodium ferrocyanide or potassium ferricyanide, wherein the latter reactant is formed in situ as an acid.

To facilitate a further understanding of the invention, the following examples are presented primarily for purposes of illustrating certain more specific details thereof. The examples are not to be taken as limitative of the invention. Unless otherwise specified, all parts are by weight and the analyses are in percent.

*Example A.—Preparation of dodecylamine ferrocyanide*

A solution of 18.5 grams (0.10 mole) of dodecylamine in water containing a slight excess of hydrochloric acid is diluted to 75 milliliters and added with stirring to a solution of 12.1 grams (0.025 mole) of sodium ferrocyanide decahydrate in 39 milliliters of water. The mixture is diluted to about 400 milliliters with water, and the cream-colored precipitate is filtered, washed thoroughly with water, ethanol and ether, respectively, and then dried in vacuo. A yield of 23.4 grams of desired product having an indefinite melting point between 270° C. and 320° C. is obtained. Upon analysis in percent, the following data are noted:

Calc'd for $C_{54}H_{112}FeN_{10}$: C, 67.74; H, 11.79; N, 14.63; Fe, 5.83. Found: C, 67.14; H, 11.78; N, 14.37; Fe, 5.67.

*Example B.—Preparation of tetradecylamine ferrocyanide*

A solution of 2.16 grams (0.010 mole) of ferrocyanic acid (prepared by precipitation with hydrochloric acid from an aqueous solution of potassium ferrocyanide trihydrate and subsequent filtration) in 100 milliliters of ethanol is added with stirring to a solution of 8.54 grams (0.040 mole) of tetradecylamine in 300 milliliters of ethanol. The solid precipitate is filtered, washed with ethanol, and dried in vacuo. A yield of 8.46 grams of a light green solid whose melting point is indefinite is obtained with color changes above 150° C. analyzing in percent as follows:

Calc'd for $C_{62}H_{128}FeN_{10}$: C, 69.62; H, 12.06; N, 13.10; Fe, 5.22. Found C, 69.44; H, 12.19; N, 13.10; Fe, 5.41.

*Example C.—Preparation of decylamine ferrocyanide*

A solution of 4.84 grams (0.010 mole) of sodium ferrocyanide decahydrate in 50 milliliters of water is added with stirring to a solution of 8.69 grams (0.040 mole) of decylamine acetate in 200 milliliters of water. The precipitate is filtered, washed thoroughly with water and ethanol, and dried in vacuo. There is obtained a yield of 7.70 grams of a cream-colored solid that turns yellowish on exposure to air and whose melting point is indefinite, with color changes above 150° C., analyzing (in percent) as follows:

Calc'd for $C_{46}H_{96}FeN_{10}$: C, 65.37; H, 11.45; N, 16.57; Fe, 6.61. Found: C, 64.83; H, 11.34; N, 16.42; Fe, 6.72.

*Example D.—Preparation of 1-methyldodecylamine ferrocyanide*

A solution of 6.1 grams (0.013 mole) of sodium ferrocyanide decahydrate in 200 milliliters of water is added gradually with stirring to a solution of 13.0 grams (0.05 mole) of 1-methyldodecylamine acetate, prepared from 1-methyldodecylamine and acetic acid in ether, in 200 milliliters of water. The resulting precipitate is filtered, washed thoroughly with water, dried, then washed with ether, and redried. The yield of desired product is 11.5 grams and possesses an indefinite melting point, with color changes above about 140° C. Upon analysis (in percent) the following is noted:

Calc'd for $C_{58}H_{120}FeN_{10}$: C, 68.73; H, 11.94; N, 13.82; Fe, 5.51. Found: C, 68.72; H, 11.97; N, 13.53; Fe, 5.59.

*Example E.—Preparation of octylamine ferrocyanide*

A solution of 2.6 grams (0.02 mole) of octylamine in 200 milliliters of ethanol is added to a solution of 1.1 grams (0.005 mole) of ferrocyanic acid in 50 milliliters of ethanol. The resulting precipitate is filtered, washed with ethanol, and dried in vacuo. Yield 2.0 grams (55% of theory); melting point is indefinite, with color changes above about 190° C. The product is indicated by analysis to contain ⅔ molecule of ethanol of crystallization per molecule of ferrocyanide salt. Upon analysis (in percent) the following is noted:

Calc'd for $C_{38}H_{80}FeN_{10} \cdot \tfrac{2}{3}C_2H_5OH$: C, 61.86; H, 11.09; N, 18.34; Fe, 7.31. Found: C, 61.53; H, 10.65; N, 18.46; Fe, 7.83.

*Example F.—Preparation of decylamine ferricyanide*

A solution of 4.8 grams (0.015 mole) of potassium ferricyanide in 50 milliliters of water is added slowly with stirring to a solution of 10.0 grams (0.046 mole) of decylamine acetate in 75 milliliters of water. The resulting sticky yellow precipitate is filtered, washed with water, and redissolved in ethanol. The ethanol solution is filtered and the filtrate is diluted with ether. The reddish waxy precipitate is filtered, and again dissolved in ethanol and precipitated with ether. The final precipitate is filtered and dried. A yield of 3.9 grams of desired product whose melting point is indefinite is obtained. Upon analysis, there is noted the following in percent:

Calc'd for $C_{36}H_{72}FeN_9$: C, 62.95; H, 10.57; N, 18.36; Fe, 8.13. Found: C, 62.53; H, 10.60; N, 18.49; Fe, 8.35.

*Example G.—Preparation of dodecylamine ferricyanide*

A solution of 1.1 grams (0.003 mole) of potassium ferricyanide in 5 milliliters of water is added slowly with stirring to a solution of 2.5 grams (0.01 mole) of dodecylamine acetate in 15 milliliters of water. The resulting yellow precipitate is filtered, washed with water, dissolved in ethanol, and the solution filtered and diluted with ether. The yellow solid is filtered, washed with ether and dried to recover 2.4 grams of desired product having an indefinite melting point with color changes above 85° C. On analysis (in percent), there is noted the following:

Calc'd for $C_{42}H_{84}FeN_9$: C, 65.42; H, 10.98; N, 16.35; Fe, 7.24. Found: C, 65.33; H, 10.93; N, 16.37; Fe, 7.39.

*Example H.—Preparation of hexadecylamine ferrocyanide*

A solution of 7.2 grams (0.03 mole) of hexadecylamine in 150 milliliters of ethanol is added to a solution of 1.6 grams (0.075 mole) of ferrocyanic acid in 15 milliliters of ethanol. The resulting precipitate is filtered, washed with ethanol, then with ether, and dried in vacuo. A yield of 8.2 grams having an indefinite melting point with color changes above about 150° C. is noted. Analysis (in percent) is as follows:

Calc'd for $C_{72}H_{144}FeN_{10}$: C, 71.91; H, 12.04; N, 11.62; Fe, 4.63. Found: C, 71.97; H, 12.17; N, 11.70; Fe, 4.50.

*Example I.—Preparation of hexadecylamine ferricyanide*

A saturated solution of hexadecylamine in ethanol is added slowly to a solution of ferricyanic acid in ethanol in an amount slightly beyond the point where a precipitate ceases to form. The precipitate is filtered, washed with ethanol, and dried. The melting point of the desired product is indefinite, with color changes from about 150° C. and analyzing in percent as follows:

Calc'd for $C_{54}H_{108}FeN_9$: C, 69.04; H, 11.59; N, 13.42; Fe, 5.95. Found: C, 69.35; H, 11.83; N, 12.58; Fe, 5.87.

*Example J.—Preparation of 3-(octyloxy)propylamine ferrocyanide*

A mixture of 7.5 grams (0.04 mole) of 3-(octyloxy)-propylamine and 2.4 grams (0.04) mole of acetic acid is dissolved in 200 milliliters of warm water. A solution of 4.8 grams (0.01 mole) of sodium ferrocyanide decahydrate in 50 milliliters of water is added with stirring. The resulting precipitate is filtered, washed with water, then with ethanol, and dried in vacuo. It is triturated with methylene chloride and redried. A yield of 7.8 grams of desired product whose melting point is 170°–180° C. with decomposition is obtained and analyzes in percent as:

Calc'd for $C_{50}H_{104}FeO_4N_{10}$: C, 62.21; H, 10.86; N, 14.51; Fe, 5.79. Found: C, 62.04; H, 10.70; N, 14.26; Fe, 6.11.

*Example K.—Preparation of cocoamine ferrocyanide*

A solution of 99.3 grams (about 0.5 mole) of cocoamine ("Armeen CD," a commercial product from Armour Industrial Chemical Co., and reported to contain approximately 8% octylamine, 9% decylamine, 47% dodecylamine, 18% tetradecylamine, 8% hexadecyamine, 5% octadecylamine and 5% octadecenylamine) in a mixture of 500 milliliters of water and 33.5 grams of glacial acetic acid is stirred during addition of a solution of 66.8 grams of sodium ferrocyanide decahydrate in 230 milliliters of water. Another 100 milliliters of water is added at the end to improve stirability. The mixture is stirred several minutes more, then filtered. The light-colored solid product is washed well with water, then with methanol, and air-dried. A yield of 124 grams is obtained.

*Example L.—Preparation of Octadecylamine ferrocyanide*

A solution of 6.0 grams (0.018 mole) of octadecylamine acetate in a mixture of 620 milliliters of water, 2 milliliters of acetic acid, and 150 milliliters of ethanol is prepared with gentle warming. A solution of 2.17 grams (0.0045 mole) of sodium ferrocyanide decahydrate in 10 milliliters of water is added gradually with stirring. The mixture is stirred 10 minutes more, and the greenish solid is filtered, washed with water and with methanol and air-dried. As desired product, there is obtained a yield of 3.5 grams whose melting point is indefinite and upon analysis (in percent), there is noted the following:

Calc'd for $C_{78}H_{160}FeN_{10}$: C, 72.40; H, 12.46; N, 10.82; Fe, 4.31. Found: C, 72.62; H, 12.30; N, 10.89; Fe, 4.18.

*Example M.—Preparation of 3-(decyloxy)propylamine ferrocyanide*

A mixture of 5.0 grams (0.023 mole) of 3-(decyloxy)-propylamine and 3.0 grams (0.050 mole) of glacial acetic acid in ether is evaporated to dryness. The resultant solid amine acetate is dissolved in 50 milliliters of water, and treated gradually with stirring with a solution of 2.75 grams (0.0057 mole) of sodium ferrocyanide decahydrate in about 20 milliliters of water. The mixture is stirred 5 minutes more and the off-white solid precipitate is filtered off and washed well with water, then with methylene chloride. It is dried in vacuo. Yield of desired product is 4.9 grams and analyzes (in percent) as follows:

Calc'd for $C_{58}H_{120}N_{10}O_4Fe$: C, 64.65; H, 11.23; N, 13.00; Fe, 5.18. Found: C, 64.49; H, 11.26; N, 12.87; Fe, 5.35.

*Example N.—Preparation of 3-(dodecylthio)propylamine ferrocyanide*

A solution of sodium ferrocyanide decahydrate (1.88 grams, 0.0039 mole) in about 10 milliliters of water is added gradually with stirring to a solution of 5.00 grams (0.0156 mole) of 3-(dodecylthio)propylamine acetate in 50 milliliters of water. The mixture is stirred for an additional 10 minutes and the light-colored solid precipitate is filtered off, washed thoroughly with water, then with acetone, and dried. A 3.7 gram yield of desired product whose melting point is indefinite is obtained. On analysis (in percent), the following is noted:

Calc'd for $C_{66}H_{136}FeN_{10}S_4$: C, 63.21; H, 10.93; N, 11.17; S, 10.22; Fe, 4.45. Found: C, 63.05; H, 10.95; N, 10.89; S, 10.83; Fe, 4.79.

In the example above, the 3-(dodecylthio)propylamine is readily prepared from a reduction of 3-(dodecylthio)-propionitrile by means of lithium aluminum hydride and followed by conversion to the acetate salt by treatment in ether solution with glacial acetic acid.

*Example O.—Preparation of 3-(dodecylthio)propylamine ferricyanide*

A solution of 2.48 grams (0.0076 mole) of potassium ferricyanide in 6 milliliters of water is added gradually with stirring to a solution of 7.2 grams (0.0023 mole) of 3-(dodecylthio)propylamine acetate in 50 milliliters of water. Stirring is continued for an additional 10 minutes and the precipitate is filtered and washed sparingly with water. Trituration with acetone converts the product to a yellow solid, which is again filtered and washed on the funnel with acetone. Air-drying provides 6.1 grams of solid (82% of theory). Analysis (in percent) is as follows:

Calc'd for $C_{51}H_{102}N_9S_3Fe$: C, 61.65; H, 10.34; N, 12.69; S, 9.68; Fe, 5.62. Found: C, 61.90; H, 10.45; N, 12.51; S, 9.47; Fe, 5.68.

*Example P.—Preparation of 3-(ethoxyethoxyethoxy) propylamine ferrocyanide*

3-(ethoxyethoxyethoxy)propylamine (41.3 grams, 0.22 mole) is added dropwise to a stirred and cooled solution of 10.5 grams (0.049 mole) of ferrocyanic acid in 155 milliliters of ethanol. A white precipitate is formed. The mixture is stirred for an additional 25 minutes, then filtered, and the product washed with additional alcohol and is air-dried. A yield of 37.1 grams of desired product is obtained. Upon analysis (in percent), the following is noted:

Calc'd for $C_{42}H_{88}N_{10}FeO_{12}$: C, 51.42; H, 9.04; N, 14.28; Fe, 5.69. Found: C, 51.22; H, 9.03; N, 14.57; Fe, 5.93.

*Example Q.—Preparation of 3-(butoxyethoxy)propylamine ferrocyanide*

3-(butoxyethoxy)propylamine (4 moles), prepared from the adduct of 2-butoxyethanol ("Butyl Cellosolve") and acrylonitrile by reduction of the nitrile group to an amine, is dissolved in dilute acetic acid. To the latter mixture is added 1 mole of sodium ferrocyanide dissolved in water. Resultant desired product, recovered in good yield, is filtered, washed and dried.

To demonstrate the bacteriotoxic and fungitoxic activities of the compounds of the instant invention, the following examples are presented.

*Example 1*

To determine the antibacterial activity of the compounds of the instant invention, several tests are made utilizing the species, *Aerobacter aerogenes, Staphylococcus aureus* and *Xanthomonas vesicatoria. Aerobacter aerogenes* is an organism used by the Paper Institute to evaluate slime control agents for paper mills. *Staphylococcus aureus* is an organism used for assaying bactericides and is found on the skin of both man and lower animals. *Xanthomonas vesicatoria* is the causative pathogen of bacterial spot on tomatoes and peppers.

In the test, 1 ml. of a 1000 p.p.m. preparation of test compound is added to 9 ml. of sterile deionized water in test tubes. Three tubes are employed for evaluation of each compound with each compound being evaluated at 100 p.p.m. concentration. One test tube of each treatment is inoculated with one drop of a 24-hour peptone broth culture of each of the three test organisms. The inoculated tubes are then incubated for 24 hours at room temperature with no nutrient present. At the end of the 24 hour incubation period, 1.1 ml. of 10% peptone is added aseptically to each tube and the tubes are then incubated for 24 hours at 37° C. At the end of the incubation period all tubes are examined and the clear tubes (i.e., those with no growth) are subcultured to clear sterile broth. If growth appears in the subculture after 24 hours, the compound causes stasis. If no growth occurs in the subculture after the 24-hour period, the compound causes kill of the test organism.

The results of the tests with the compounds of the invention are reported in Table I below. Ratings used in the table are as follows:

9=kill
5=stasis
0=no effect

TABLE I.—ANTIBACTERIAL TEST—BROTH CULTURE

| Compound | Aerobacter aerogenes Gram − | Staphylococcus aureus Gram + | Xanthomonas vesicatoria Gram − |
|---|---|---|---|
| n-$C_8H_{17}$—O—$(CH_2)_3NH_2 \cdot \frac{1}{4}H_4Fe(CN)_6$ | 5 | 0 | 9 |
| n-$C_{10}H_{21}NH_2 \cdot \frac{1}{4}H_4Fe(CN)_6$ | 9 | 5 | 9 |
| n-$C_{10}H_{21}NH_2 \cdot \frac{1}{3}H_3Fe(CN)_6$ | 9 | 5 | 9 |
| n-$C_{10}H_{21}$—O—$(CH_2)_3NH_2 \cdot \frac{1}{4}H_4Fe(CN)_6$ | 9 | 0 | 5 |
| n-$C_{12}H_{25}NH_2 \cdot \frac{1}{4}H_4Fe(CN)_6$ | 9 | 9 | 9 |
| n-$C_{12}H_{25}NH_2 \cdot \frac{1}{3}H_3Fe(CN)_6$ crude product | 9 | 9 | 9 |
| $CH_3$—CH—$(CH_2)_{10}CH_3 \cdot \frac{1}{4}H_4Fe(CN)_6$ | 9 | 9 | 9 |

Example 2

The antifungal activity of the compounds of the invention is demonstrated by the following test using a variety of test organisms. The organisms employed in said tests are set forth below:

Aspergillus niger
Fusraium lycopersicum
Monilina fructicola
Pythium debaryanum
Rhizoctonia solani
Stemphylium sarcinaeforme
Colletotrichum lagenarium
Verticillium albo-atrum
Pseudomonas solanacearum The test procedure employed is as follows: Two ml. of a 1000 p.p.m. preparation of the test compound are placed in separate sterile petri dishes. Eighteen ml. of sterile Difco Sabouraud's agar is aseptically mixed with the solution of test compound in order to provide uniform distribution of the test compound throughout the molten agar. The prepared plates are allowed to harden and then inoculated with one drop of a spore and mycelium suspension prepared from individual 14 day old cultures of the test organism and with one drop of bacterial suspension prepared from an agar slant. The plates are incubated at room temperature for 48 hours. Thereafter they are examined and ratings of growth or no growth are made and recorded. The results of these tests are reported in Table II below.

The test procedure involves first the preparation of a 100 p.p.m. suspension of test compound in water. The solutions are placed in one dram "opticlear" vials and separately inoculated with one drop of a spore suspension prepared from 7 day cultures of *Aspergillus niger* and 14 day old cultures of *Monilinia fructicola* and *Stemphylium sarcinaeforme*, all grown on potato-dextrose agar. The vials containing the separately inoculated solutions of test compounds are then capped and placed on a rotating tumbler for 24 hours to assure contact of the organism with the test compound. After 24 hours, the vials are removed and examined for inhibition of growth of mycelium.

Activity of the compounds is recorded as percent inhibition and the results of these tests are found in Table III below.

TABLE III.—SPORE GERMINATION

| Compound | Percent Inhibition | | | | | | | | |
|---|---|---|---|---|---|---|---|---|---|
| | *Monilinia fructicola* | | | *Stemphylium sarcinaeforme* | | | *Aspergillus niger* | | |
| | Concentration in p.p.m. | | | | | | | | |
| | 100 | 10 | 1 | 100 | 10 | 1 | 100 | 10 | 1 |
| n-$C_{12}H_{25}NH_2 \cdot \frac{1}{4}H_4Fe(CN)_6$ | 100 | 100 | 100 | 100 | 100 | 100 | 100 | 0 | |
| $CH_3CH_2-O-CH_2CH_2-O-CH_2CH_2-O-(CH_2)_3NH_2 \cdot \frac{1}{4}H_4Fe(CN)_6$ | 95 | 0 | | 95 | 0 | | 95 | 0 | |

Example 4

The effectiveness of the compounds of the instant invention for controlling *Colletotrichum lagenarium*, the causative agent of cucumber anthracnose, and *Phytophthora infestans*, the organism responsible for tomato late blight, is demonstrated by the following tests wherein five tomato and four cucumber plants interplanted in jiffy-flats two weeks from transplanting time are utilized. All flats, one flat per treatment rate, are sprayed to run off with a 50/50 acetone/water solution containing 500 p.p.m. or 100 p.p.m. of test compound. After drying, the plants are inoculated with the disease organisms prepared as follows: *Phytophthora infestans*, cultured for two weeks

TABLE II.—AGAR DILUTION AT 100 P.P.M.

| Compound | *Aspergillus niger* | *Fusarium lycopersicum* | *Monilinia fructicola* | *Pythium debaryanum* | *Rhizoctonia solani* | *Stemphylium sarcinaeforme* | *Pseudomonas solanacearum* | *Colletotrichum lagenarium* | *Verticillium alboatrum* |
|---|---|---|---|---|---|---|---|---|---|
| | Ratings [1] | | | | | | | | |
| n-$C_{10}H_{21}NH_2 \cdot \frac{1}{3}H_3Fe(CN)_6$ | + | + | − | + | − | − | + | − | + |
| n-$C_{10}H_{21}-O-(CH_2)_3NH_2 \cdot \frac{1}{4}H_4Fe(CN)_6$ | + | + | − | + | + | − | + | − | − |
| $CH_3(CH_2)_{7,9,11,13,15,17}NH_2 \cdot \frac{1}{4}H_4Fe(CN)_6$ [2] | + | + | + | + | + | − | + | − | − |
| n-$C_{12}H_{25}NH_2 \cdot \frac{1}{4}H_4Fe(CN)_6$ crude product | + | + | − | − | + | − | + | + | − |
| n-$C_{12}H_{25}NH_2 \cdot \frac{1}{3}H_3Fe(CN)_6$ crude product | + | + | − | − | + | − | + | − | + |
| $CH_3-\underset{\underset{NH_2}{\mid}}{CH}-(CH_2)_{10}CH_3 \cdot \frac{1}{4}H_4Fe(CN)_6$ | | | | | | | | | |
| n-$C_{12}H_{25}-S-(CH_2)_3NH_2 \cdot \frac{1}{3}H_3Fe(CN)_6$ | + | + | − | + | + | − | + | + | + |
| n-$C_{14}H_{29}NH_2 \cdot \frac{1}{3}H_3Fe(CN)_6$ | + | + | − | + | − | − | + | + | − |

[1] The + rating means growth. The − rating means no growth.
[2] Cocoamine ferrocyanide.

Example 3

The activity of the compounds of the invention for controlling pathogenic organisms responsible for diseases in agricultural crops is further demonstrated by the following tests employing the organisms *Monilinia fructicola*, the pathogen responsible for American brown rot in stone fruits; *Stemphylium sarcinaeforme*, the pathogen which incites leaf spot in legumes; and *Aspergillus niger*, the saprophyte responsible for degradation of textiles, fabrics, leather and vegetables.

on moist sterile wheat seed, is washed free of sporangia and *Colletotrichum lagenarium*, cultured for one week on potato-dextrose agar, is washed free of spores. The washings, used as the inoculum, are mixed and sprayed on the plants. The flats are then placed in a constant temperature and humidity room at 62° F. with a saturated atmosphere for 72 hours. After 72 hours, the flats are removed to the greenhouse where the plants are examined one week after treatment.

The results of these tests are recorded below in Table IV.

TABLE IV.—FOLIAR SPRAY
Protection Test—Disease Rating

| Compound | Colletotrichum lagenarium | | Phytophthora infestans | |
| --- | --- | --- | --- | --- |
| | 500 p.p.m. | 100 p.p.m. | 500 p.p.m. | 100 p.p.m. |
| n-$C_6H_{13}NH_2 \cdot \frac{1}{3}H_3Fe(CN)_6$ | Clean | Severe | N.T.[1] | N.T.[1] |
| n-$C_8H_{17}NH_2 \cdot \frac{1}{6}C_2H_5OH \cdot \frac{1}{4}H_4Fe(CN)_6$ | do | Clean | Clean | Clean. |
| n-$C_8H_{17}$—O—$(CH_2)_3NH_2 \cdot \frac{1}{4}H_4Fe(CN)_6$ | do | do | do | Do. |
| n-$C_{10}H_{21}NH_2 \cdot \frac{1}{4}H_4Fe(CN)_6$ | do | do | do | Do. |
| n-$C_{10}H_{21}NH_2 \cdot \frac{1}{3}H_3Fe(CN)_6$ | do | Trace | do | Severe. |
| n-$C_{10}H_{21}$—O—$(CH_2)_3NH_2 \cdot \frac{1}{4}H_4Fe(CN)_6$ | do | do | do | Do. |
| n-$C_{12}H_{25}NH_2 \cdot \frac{1}{4}H_4Fe(CN)_6$ | do | Clean | do | Clean. |
| $(C_{12}H_{25})$—$NH_2 \cdot \frac{1}{4}H_4Fe(CN)_6$ | Trace | Slight | do | Trace. |
| $CH_3(CH_2)_{7,9,11,13,15,17}NH_2 \cdot \frac{1}{4}H_4Fe(CN)_6$ | Clean | Trace | Trace | Do. |
| n-$C_{12}H_{25}NH_2 \cdot \frac{1}{4}H_4Fe(CN)_6$ crude product | Trace | do | Clean | Clean. |
| n-$C_{12}H_{25}NH_2 \cdot \frac{1}{3}H_3Fe(CN)_6$ crude product | Clean | Clean | do | Trace. |
| $CH_3$—CH—$(CH_2)_{10}CH_3 \cdot \frac{1}{4}H_4Fe(CN)_6$ \| $NH_2$ | do | do | do | Clean. |
| n-$C_{12}H_{25}$—S—$(CH_2)_3NH_2 \cdot \frac{1}{4}H_4Fe(CN)_6$ | N.T.[1] | N.T.[1] | do | Slight. |
| n-$C_{12}H_{25}$—S—$(CH_2)_3NH_2 \cdot \frac{1}{3}H_3Fe(CN)_6$ | Trace | Moderate | do | Trace. |
| n-$C_{14}H_{29}NH_2 \cdot \frac{1}{4}H_4Fe(CN)_6$ | Clean | Clean | do | Clean. |
| n-$C_{14}H_{29}NH_2 \cdot \frac{1}{3}H_3Fe(CN)_6$ | N.T.[1] | Trace | N.T.[1] | Do. |
| n-$C_{16}H_{33}NH_2 \cdot \frac{1}{4}H_4Fe(CN)_6$ | Trace | Slight | Clean | Trace. |
| n-$C_{16}H_{33}NH_2 \cdot \frac{1}{3}H_3Fe(CN)_6$ | do | do | Trace | Slight. |
| n-$C_{18}H_{37}NH_2 \cdot \frac{1}{3}H_3Fe(CN)_6$ | N.T.[1] | N.T.[1] | Clean | Trace. |

[1] N.T. means no test

*Example 5.—Apple scab*

The effectiveness of the compounds of the instant invention for controlling *Venturia inaequalis*, the causative agent of apple scab, is demonstrated by the following test.

Twelve apple trees are sprayed to run off with solutions of test compounds in 50/50 acetone/water mixtures, four trees each at the rates of 1200 p.p.m. (1 lb./100 gal.); 600 p.p.m. (½ lb./100 gal.) and 300 p.p.m. (¼ lb./100 gal.). After the deposits are allowed to dry, the inoculum, which is prepared from the infected apple leaves, is sprayed on the trees. The trees are then placed in a constant temperature and humidity room at 72° F. with a saturated atmosphere for 96 hours. After this 96 hour incubation period, the trees are removed to the greenhouse where they are examined after 14 days from the inoculation time.

The results of these tests are recorded in Table V below.

TABLE V.—APPLE SCAB
Seedling Apples—Disease Rating

| Compound | 1 lb./100 gal., 1,200 p.p.m. | ½ lb./ 100 gal., 600 p.p.m. | ¼ lb./ 100 gal., 300 p.p.m. |
| --- | --- | --- | --- |
| n-$C_8H_{17}NH_2 \cdot \frac{1}{6}C_2H_5OH \cdot \frac{1}{4}H_4Fe(CN)_6$ | Clean | Trace | Severe. |
| n-$C_8H_{17}$—O—$(CH_2)_3NH_2 \cdot \frac{1}{4}H_4Fe(CN)_6$ | do | Clean | Slight. |
| n-$C_{10}H_{21}NH_2 \cdot \frac{1}{4}H_4Fe(CN)_6$ | do | do | Severe. |
| n-$C_{10}H_{21}NH_2 \cdot \frac{1}{3}H_3Fe(CN)_6$ | do | do | |
| n-$C_{12}H_{25}NH_2 \cdot \frac{1}{4}H_4Fe(CN)_6$ | do | Clean | Trace |
| $(C_{12}H_{25})$—$NH_2 \cdot \frac{1}{4}H_4Fe(CN)_6$ | do | do | Clean |
| n-$C_{12}H_{25}NH_2 \cdot \frac{1}{3}H_3Fe(CN)_6$ crude product | do | do | Severe. |
| $CH_3$—CH$(CH_2)_{10}CH_3 \cdot \frac{1}{4}H_4Fe(CN)_6$ \| $NH_2$ | do | do | Clean. |
| n-$C_{12}H_{25}$—S—$(CH_2)_3NH_2 \cdot \frac{1}{4}H_4Fe(CN)_6$ | Slight | Clean | Do. |
| n-$C_{14}H_{29}NH_2 \cdot \frac{1}{4}H_4Fe(CN)_6$ | Clean | Slight | Severe. |
| n-$C_{16}H_{33}NH_2 \cdot \frac{1}{4}H_4Fe(CN)_6$ | Trace | do | Do. |
| n-$C_{16}H_{33}NH_2 \cdot \frac{1}{3}H_3Fe(CN)_6$ | Clean | | |

Fungicidal compositions can be prepared either as a suspension in a suitable non-solvent or as a dust. Suspensions or dispersions of the compound in a non-solvent, such as water, are advantageously employed in treating plant foliage.

It has been found that for maximum protection of fruits, seeds, plant tubers and other organic materials during storage, it is advantageous to employ a solution of the fungicide in oil, which solution is then emulsified in water. The oil that can be used as a solvent for the fungicide are hydrocarbons, such as, for instance, benzene and toluene. Halogenated hydrocarbons, such as chlorobenzene, chloroform, fluorotrichloromethane and dichlorodifluoromethane, are also contemplated.

The aerosol method may further be used to apply the compounds of the present invention to foliage. Solutions for the aerosol treatment are prepared either by dissolving the chemical directly in a highly volatile liquid carrier, such as trifluorochloromethane, or by dissolving the fungicide in a less volatile solvent, such as benzene, and then admixing such solution with the highly volatile liquid aerosol carrier.

Dusts may be prepared by mixing the compound with dusting materials, as, for example, clay, bentonite, pumice, fuller's earth, pyrophyllite and equivalents thereof. Thus, seeds, for instance, can be protected from soil organisms harmful to them by incorporating the compounds with a solid carrier and admixing the composition with the seed as by tumbling or rotating.

A wide range of fungicidal compound to inert carrier or diluent, usually up to about 10% by weight, of the compound, based on the weight of the inert additive, can advantageously be employed. However, it has been found that for aqueous dispersion preparations from 0.01% to 1.0% of the active ingredient is adequate. For dust compositions, however, 5% of the active ingredient are effective for most applications.

In an aqueous suspension, the overall composition may contain a dispersing agent for the compound. In general, any commercially available dispersing or surface-active agent can be utilized in forming such dispersions. Illustrative of the dispersants are: the fatty acid esters of polyhydric alcohols, such as "Span," or the alkylarylpolyether alcohols and equivalents thereof. Usually, from one to five parts of the dispersing agent per 100 parts of the fungicide constitutes a satisfactory range.

I claim:
1. A method for protecting organic materials and agricultural crops susceptible to attack by bacteria and fungi which comprises: applying to said materials and crops to be protected an effective amount of a compound of the formula:

$$(R-NH_2)_m \cdot H_m Fe(CN)_6$$

or $$(R'-X-R''-NH_2)_m \cdot H_m Fe(CN)_6$$

wherein R is an alkyl substituent containing from 6 to 18 carbon atoms; R' represents an alkyl substituent containing from 4 to 14 carbon atoms, an alkoxyalkyl or alkoxyalkoxyalkyl substituent containing from 6 to 16 carbon atoms; X is either oxygen or sulfur; R'' is an alkylene bridge containing from 2 to 4 carbon atoms; and $m$ represents the integer 3 or 4.

2. A method according to claim 1 wherein the compound is dodecylamine ferrocyanide.
3. A method according to claim 1 wherein the compound is tetradecylamine ferrocyanide.
4. A method according to claim 1 wherein the compound is 1-methyldodecylamine ferrocyanide.
5. A method according to claim 1 wherein the compound is dodecylamine ferricyanide.
6. A method according to claim 1 wherein the compound is 3-(octyloxy)propylamine ferrocyanide.
7. A method according to claim 1 wherein the compound is cocoamine ferrocyanide.
8. A method according to claim 1 wherein the compound is 3-(decyloxy)propylamine ferrocyanide.
9. A method according to claim 1 wherein the compound is 3-(dodecylthio)propylamine ferrocyanide.
10. A method according to claim 1 wherein the compound is 3-(dodecylthio)propylamine ferrocyanide.

References Cited by the Examiner

Sidgwick: "Chemical Elements and Their Compounds," vol. 11, pp. 1336–1337 (1952), Oxford University Press.

LEWIS GOTTS, *Primary Examiner*.

SHEP K. ROSE, *Assistant Examiner*.